United States Patent
Drislane et al.

(10) Patent No.: US 9,262,071 B2
(45) Date of Patent: Feb. 16, 2016

(54) DIRECT MANIPULATION OF CONTENT

(75) Inventors: Helen E. Drislane, Seattle, WA (US); David A. Matthews, Seattle, WA (US); Jan-Kristian Markiewicz, Redmond, WA (US); Paul L. Cutsinger, Jr., Redmond, WA (US); Bruce A. Morgan, Bellevue, WA (US); Brian E. Manthos, Sammamish, WA (US); Prashant Singh, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 833 days.

(21) Appl. No.: 12/405,035

(22) Filed: Mar. 16, 2009

(65) Prior Publication Data
US 2010/0235733 A1 Sep. 16, 2010

(51) Int. Cl.
G06F 3/048 (2013.01)
G06F 3/0488 (2013.01)

(52) U.S. Cl.
CPC .................... G06F 3/04883 (2013.01)

(58) Field of Classification Search
USPC ........................................................ 715/702
See application file for complete search history.

(56) References Cited

U.S. PATENT DOCUMENTS

| | | | |
|---|---|---|---|
| 6,321,158 B1 | 11/2001 | DeLorme et al. | |
| 6,744,452 B1* | 6/2004 | McBrearty et al. | 715/853 |
| 6,889,138 B1 | 5/2005 | Krull et al. | |
| 7,185,274 B1 | 2/2007 | Rubin et al. | |
| 7,246,130 B2 | 7/2007 | Goodwin et al. | |
| 7,430,739 B2 | 9/2008 | Vellanki et al. | |
| 2002/0055946 A1* | 5/2002 | Prager et al. | 707/500 |
| 2003/0229900 A1 | 12/2003 | Reisman | |
| 2004/0003351 A1* | 1/2004 | Sommerer et al. | 715/517 |
| 2004/0139208 A1* | 7/2004 | Tuli | 709/230 |
| 2005/0165729 A1* | 7/2005 | Gallagher et al. | 707/1 |
| 2006/0085766 A1 | 4/2006 | Dominowska et al. | |
| 2008/0122796 A1* | 5/2008 | Jobs et al. | 345/173 |
| 2008/0177859 A1* | 7/2008 | Nickerson | 709/217 |
| 2008/0294974 A1* | 11/2008 | Nurmi et al. | 715/204 |
| 2009/0100356 A1* | 4/2009 | Kujda | 715/760 |

OTHER PUBLICATIONS

Jeremey Reimer, Opera releases 9.2 browser, adds "Speed Dial," Apr. 2007, Ars Technica, http://arstechnica.com/old/content/2007/04/opera-releases-9-2-browser-adds-speed-dial.ars.*
MacBook Air and MacBook Pro (Early 2008): Useful keyboard and trackpad tips and shortcuts, Nov. 4, 2008, Apple, http://support.apple.com/kb/HT1115.*
Morville, Peter et al., Information Architecture for the World Wide Web, Third Edition, Dec. 2006, O'Reilly Media, Third Edition.*
"S60 Blogs", Retrieved at<<http://www.pdainfo.org/pagesitehtml.php?site=129&full=1>>, Nov. 24, 2008, pp. 1-139.

* cited by examiner

*Primary Examiner* — William Trapanese
(74) *Attorney, Agent, or Firm* — Bryan Webster; Raghu Chinagudabha; Micky Minhas

(57) ABSTRACT

Various embodiments provide techniques for direct manipulation of content. The direct manipulation of content can provide an intuitive way for a user to access and interact with content. In at least some embodiments, content manipulation is "direct" in that content displayed in a user interface (e.g., one or more Web pages in a Web browser interface) can be moved in and/or out of the user interface in a direction that corresponds to user-initiated physical movements, such as the user dragging or flicking the content with the user's finger or some other type of input device.

20 Claims, 10 Drawing Sheets

US 9,262,071 B2

DIRECT MANIPULATION OF CONTENT

BACKGROUND

Many applications can keep a record of a user's navigation through content. For example, a Web browser can track Web pages that a user has navigated to and allow the user to navigate among the visited Web pages. The Web browser can track the Web pages in a temporal manner such that a user can view a Web page that the user has previously viewed by clicking back to the Web page. Also, if a user has navigated back to a previously-viewed Web page, the user can click forward to view return to a previously-viewed Web page.

While the ability to navigate through content can enhance a user's experience, many current content navigation techniques can be counter-intuitive and can require the user to learn new ways of navigation that may not make sense when compared to the user's real-world experiences.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments provide techniques for direct manipulation of content. The direct manipulation of content can provide an intuitive way for a user to access and interact with content. In at least some embodiments, content manipulation is "direct" in that content displayed in a user interface (e.g., one or more Web pages in a Web browser interface) can be moved in and/or out of the user interface in a direction that corresponds to user-initiated physical movements, such as the user dragging or flicking the content with the user's finger or some other type of input device.

BRIEF DESCRIPTION OF THE DRAWINGS

The same numbers are used throughout the drawings to reference like features.

DETAILED DESCRIPTION

Overview

Figure 1:
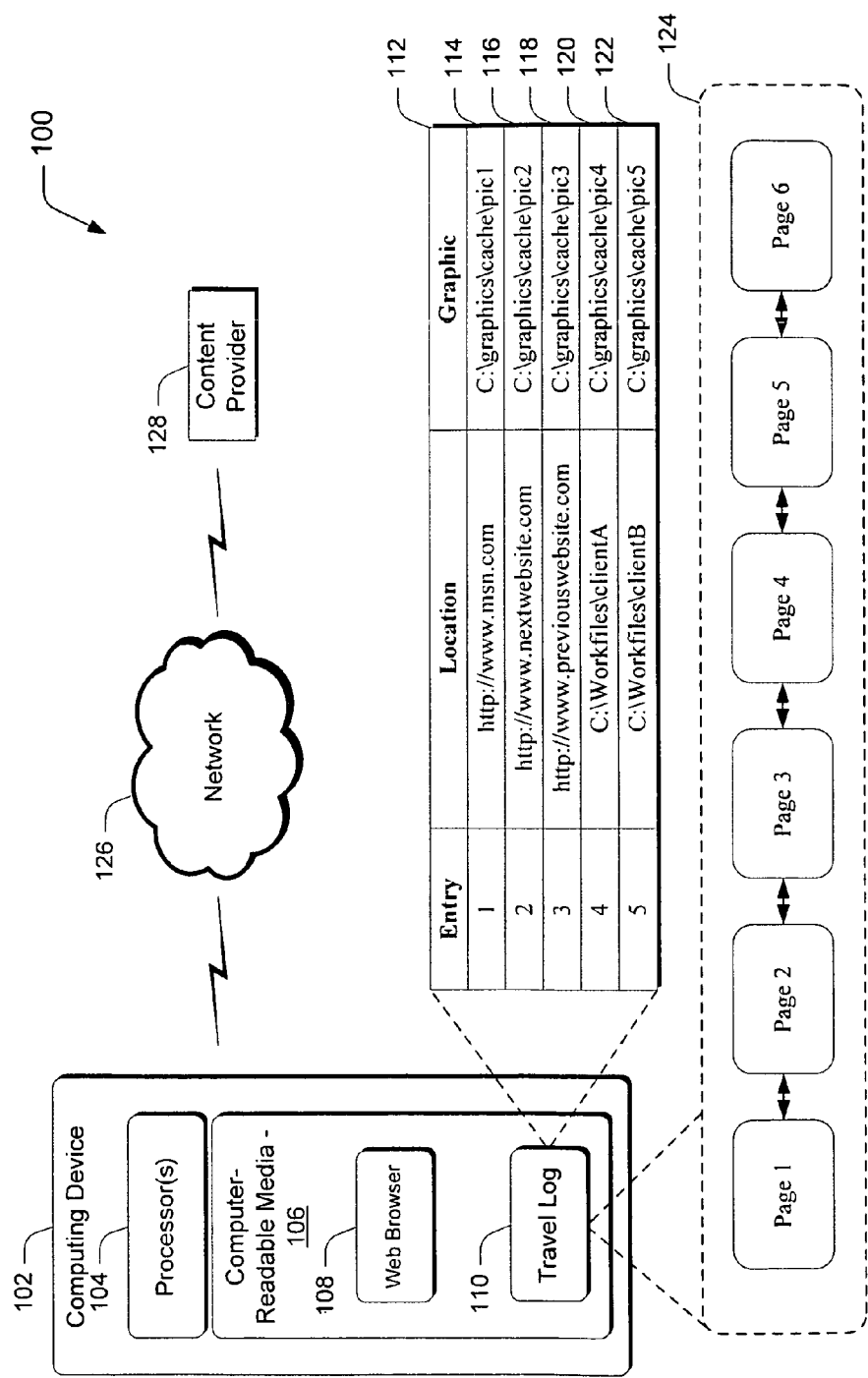
FIG. 1 illustrates an operating environment in which the inventive principles can be employed in accordance with one or more embodiments.

Various embodiments provide techniques for direct manipulation of content. The direct manipulation of content can provide an intuitive way for a user to access and interact with content. In at least some embodiments, content manipulation is "direct" in that content displayed in a user interface (e.g., one or more Web pages in a Web browser interface) can be moved in and/or out of the user interface in a direction that corresponds to user-initiated physical movements, such as the user dragging or flicking the content with the user's finger or some other type of input device. While content is discussed herein with reference to one or more Web pages, it is to be appreciated and understood that content can be embodied in a variety of different forms, such as text files, graphic files, video, audio, and so on.

In one or more embodiments, a user can interact with an application that employs a travel log that keeps track of pages, files, or other content that a user can consume or has consumed. One type of application is a Web browser. Other applications can, of course, be employed without departing from the spirit and scope of the claimed subject matter. In Web browser embodiments, the Web browser can keep a travel log of Web pages to which the user has navigated. The user can navigate among the Web pages in the travel log by moving a currently-displayed Web page out of a Web browser user interface, which can cause a different Web page from the travel log to be displayed in the user interface. In at least some embodiments, moving the currently-displayed Web page out of the Web browser user interface can be accomplished via direct manipulation of the Web page. For example, a user can utilize touch input to drag or flick the currently-displayed Web page out of the Web browser user interface. Touch input can be received by the computing device in a variety of ways, such as via user contact with a display screen (e.g., using one or more fingers), the use of a stylus or other input device, and so on. It is to be appreciated and understood, however, that other means of input may also be utilized, such as a mouse and cursor, a keyboard, and so on.

Various approaches or techniques can be utilized to implement direct content manipulation. These techniques include, by way of example and not limitation, linear representation techniques and stack representation techniques. Accordingly, in at least some embodiments, a linear representation technique of direct manipulation of content can be utilized. For example, assume that a user interacts with a Web browser to visit several different Web pages. A travel log of the visited Web pages can include a timeline, with each of the visited Web pages being placed on the timeline according to when the Web page was visited (e.g., temporally with respect to the other visited Web pages). According to some embodiments, a user can physically interact with a user interface of the Web browser that is displayed on a computing device to navigate among the Web pages included in the timeline. For example, a user's finger can drag or flick a currently-viewed Web page to the right (from the user's viewing perspective), causing one or more Web pages that occur earlier on the timeline to slide into view from the left side of the user interface. Also, the user's finger can drag or flick a currently-viewed Web page to the left, causing one or more Web pages that occur later on the timeline to slide into view from the right side of the user interface.

According to some other embodiments, a stack representation of direct manipulation of content can be utilized. In the stack representation, content can have the appearance of being "stacked" on a user interface. As with the linear techniques discussed above, some embodiments can utilize a travel log and/or a timeline of Web pages that a user has viewed. A user who is viewing a current Web page in a Web browser user interface can drag or flick the current Web page (e.g., with the user's finger) to the right to reveal an earlier (e.g., earlier on the timeline) Web page that appears from underneath the current Web page. Alternatively or additionally, the user can drag or flick the Web page to the left to reveal, underneath the current Web page, one or more Web pages that occur later on the timeline. Thus, the Web pages included in the travel log can be thought of as forming a stack that enables a user to navigate between Web pages on the timeline by "adding" and/or "removing" Web pages from the stack.

In some embodiments, the speed of movement of one or more instances of content in a user interface (e.g., one or more Web pages in a Web browser) can correspond to the speed of manipulation of content. For example, if a user drags or flicks an instance of content out of a user interface with the user's finger, the instance of content can move at the same or similar speed as the user's finger. A different instance of content that enters the user interface to replace the exiting instance of content can also move into the user interface at the same or similar speed as the user's finger. It is to be appreciated and understood, however, that content can move at a variety of different speeds, such as faster or slower than a speed at which content is manipulated. For example, an instance of content that enters a user interface can move synchronously or asynchronously with respect to content that is manipulated by a user.

In the discussion that follows, a section entitled "Operating Environment" describes but one environment in which the various embodiments can be employed. Following this, a section entitled "Example User Interfaces" describes example user interfaces in accordance with one or more embodiments. Next, a section entitled "Example Mobile Device" describes an example of a mobile device that can be used to implement various techniques discussed herein in accordance with one or more embodiments. Following this, a section entitled "Example Methods" describes example methods in accordance with one or more embodiments. Last, a section entitled "Example System" is provided and describes an example system that can be used to implement one or more embodiments.

Operating Environment

FIG. 1 illustrates an operating environment in accordance with one or more embodiments, generally at 100. Environment 100 includes a computing device 102 having one or more processors 104 and one or more computer-readable storage media 106. The computer-readable storage media 106 can include, by way of example and not limitation, all forms of volatile and non-volatile memory and/or storage media that are typically associated with a computing device. Such media can include ROM, RAM, flash memory, hard disk, removable media and the like. One specific example of a computing device is shown and described below in FIG. 10.

The computing device 102 also includes various types of software applications that can implement the functionality described above and below. One such application is a Web browser 108 that employs a travel log 110 that resides on the computer-readable storage media 106. The Web browser 108 can be implemented to access a variety of content and resources. For example, the Web browser 108 can be utilized to access one or more Web-based resources, such as a Web page, a blog site, a social networking site, and so on. Alternatively or additionally, the Web browser 108 can be utilized to access resources such as folders, files, and/or other content that can be stored locally on the computing device 102 and/or remotely.

In one or more embodiments, the travel log 110 can track content to which a user has navigated via the Web browser 108, such as one or more Web pages. In one or more embodiments, the travel log 110 includes a log table 112 that can be implemented to track content. In this particular example, log table 112 includes several Web pages that have been visited via the Web browser 108, illustrated here as table entries 114, 116, and 118. The log table 112 also includes two local folders that have been navigated to via the Web browser, illustrated here as table entries 120 and 122. In this example, each of the table entries in the log table 112 includes or is otherwise associated with a graphic file that can be utilized to represent the content and/or resource associated with the respective table entry. For example, the graphic file included with table entry 114 can include a snapshot of the Web page http://www.msn.com. The snapshot can include an image file (e.g., a .jpeg, .gif, .bmp, and so on) that can display a representation of the Web page as it appeared when it was viewed by a user. According to some embodiments, the graphic files can be utilized to represent particular instances of content when a user is navigating among instances of content, e.g., using the linear representation and/or stack representation techniques discussed above.

The travel log 110 also includes a timeline 124 that tracks content according to when the content was accessed. For example, the timeline 124 can include a series of events that correspond to a user's navigation to different instances of content, with the events being arranged temporally on the timeline. Each event can represent a user navigation to a particular instance of content, such as a Web page, a folder, a file, and so on. In the discussion herein, reference is made to a "current" instance of content, a "previous" instance of content, and a "subsequent" instance of content. With reference to timeline 124, a current instance of content can refer to an instance of content that is currently displayed in a user interface, e.g., Page 3. A previous instance of content can refer to an instance of content that occurs earlier on the timeline 124. For example, Page 2 occurs earlier on the timeline 124 than Page 3, and thus is considered to be previous with respect to Page 3. A subsequent instance of content can refer to an instance of content that occurs later on the timeline 124. For example, Page 4 occurs later on the timeline than Page 3, and thus is considered to be subsequent with respect to page 3. The discussion of these terms with reference to timeline 124 is for purposes of example only, and is not intended to limit the claimed subject matter. According to some embodiments, one or more of the events on the timeline 124 can correspond to one or more of the table entries of the log table 112. For example, Page 1 of the timeline 124 can correspond to table entry 114, and so on.

Although not expressly illustrated here, the computing device 102 can include functionality for receiving touch input and converting the touch input into digital signals (e.g., a touch digitizer). The computing device can be configured to receive touch input using one or more of a variety of techniques, such as capacitive techniques, resistive techniques, infrared techniques, and so on.

In addition, environment 100 includes a network 126, such as the Internet, and one or more content providers 128. Examples of the content providers 128 include a website, a Web log ("blog"), a file sharing site, a social networking site, or any other resource through which content can be accessed. In at least some embodiments, computing device 102 can be utilized to access the content providers 128 via the network 126. For example, a user can utilize the Web browser 108 to access content hosted by the content providers 128, such as a Web site, a folder, a file, and so on.

Computing device 102 can be embodied as any suitable computing device such as, by way of example and not limitation, a desktop computer, a portable computer, a handheld computer such as a personal digital assistant (PDA), cell phone, and the like.

Having considered an example operating environment, consider now a discussion of example user interfaces for implementing one or more of the techniques discussed herein for the direct content manipulation. The example user interfaces are discussed with reference to environment 100 above.

Example User Interfaces

Figure 2:
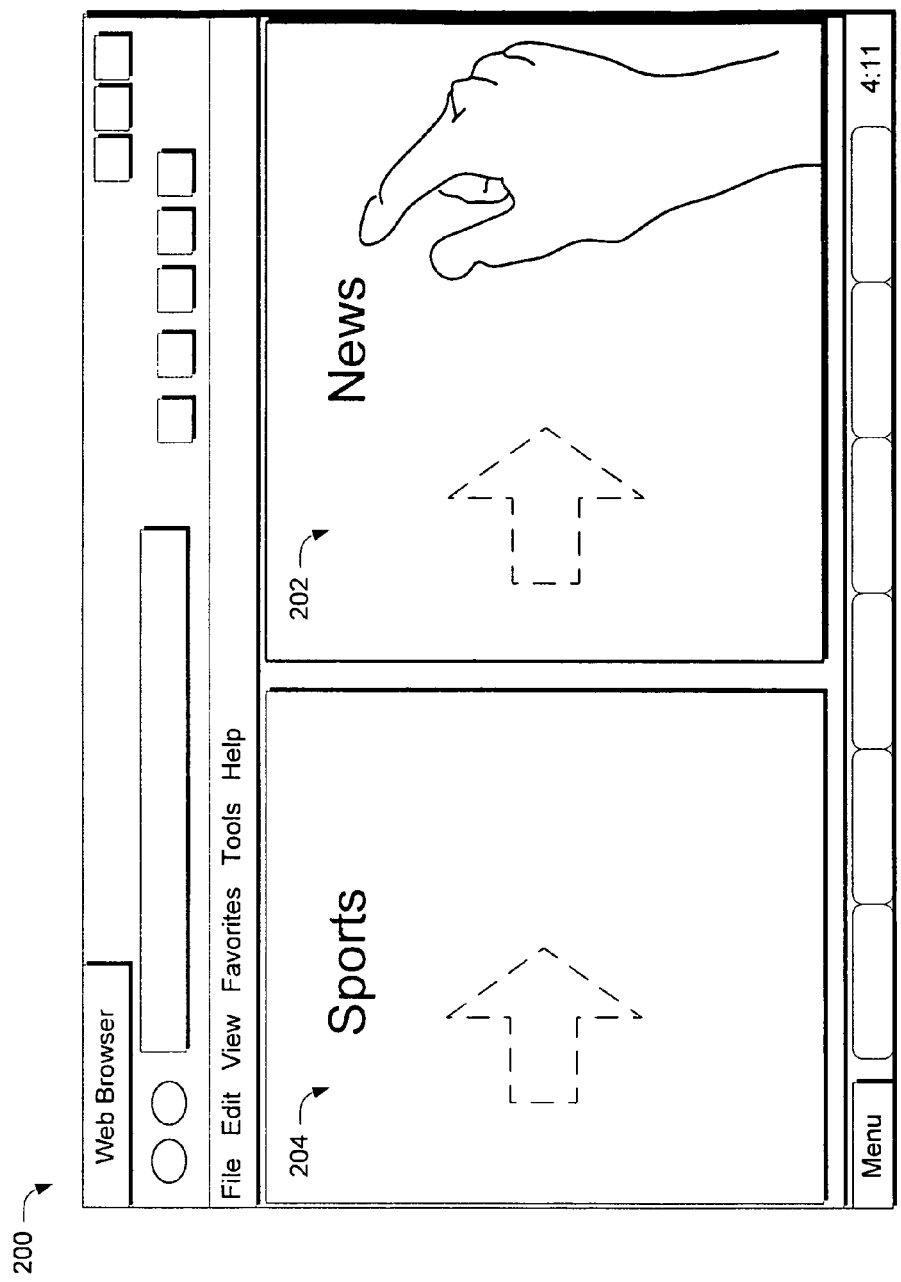
FIG. 2 illustrates an example Web browser user interface in accordance with one or more embodiments.

FIG. 2 illustrates an example Web browser user interface, generally at 200, for implementing a linear representation of direct content manipulation. In this example, a user navigates to previous content. For purposes of this example, assume that a user has navigated to a current Web page 202 via a Web browser. Accordingly, the current Web page 202 is displayed on an associated computing device as part of the Web browser user interface 200. In one or more embodiments, a user can navigate to a previous Web page 204 (e.g., a previously-viewed Web page) by dragging or flicking the current Web page 202 to the right in the Web browser user interface 200. According to some embodiments, dragging or flicking the current Web page 202 to the right can cause the current Web page to appear to leave the Web Browser user interface 200 at the right side of the user interface. In this example, the user's finger contacts a display of the computing device and executes a dragging or flicking motion from left-to-right to drag or flick the current Web page 202 out of the Web browser user interface 200. As discussed above, other techniques for content manipulation can also be used, such as dragging or flicking with a stylus or other device, using a mouse and cursor, and so on.

According to some embodiments, when the user causes the current Web page 202 to move to the right and out of the Web browser user interface 200, the previous Web page 204 enters the Web browser user interface from the left. In at least some embodiments, the previous Web page 204 can appear to slide into the Web browser user interface 200 from the left, and at the same and/or similar speed of movement as the exit of the current Web page 202.

Figure 3:
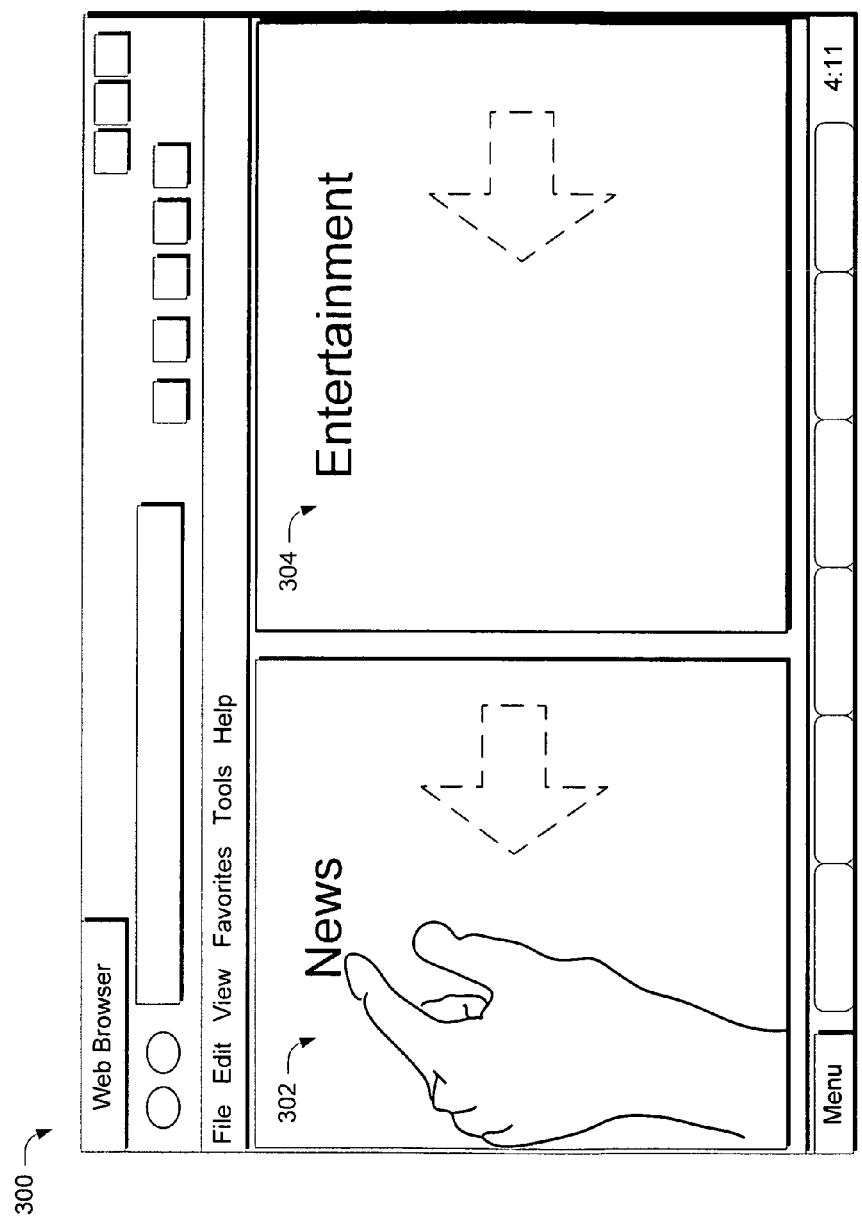
FIG. 3 illustrates an example Web browser user interface in accordance with one or more embodiments.

FIG. 3 illustrates an example Web browser user interface, generally at 300, for implementing a linear representation of direct content manipulation. In this example, a user navigates to subsequent content.

For purposes of this example, assume that a user has navigated to a previous Web page 302 via a Web browser, and the Web page is displayed on a computing device as part of the Web browser user interface 300. In one or more embodiments, a user can navigate to a subsequent Web page 304 (e.g., a Web page that was initially viewed before Web page 302) by dragging or flicking the Web page 302 to the left of the Web browser user interface 300. According to some embodiments, dragging or flicking the current Web page 302 to the left can cause the current Web page to appear to leave the Web Browser user interface 300 at the left side of the user interface.

In at least some embodiments, when the user drags or flicks previous Web page 302 to the left and out of the Web browser user interface 300, the subsequent Web page 304 enters the Web browser user interface from the right. In at least some embodiments, the subsequent Web page 304 can appear to slide into the Web browser user interface 300 from the right at the same and/or similar speed of movement as the exit of the previous Web page 302.

Figure 4:
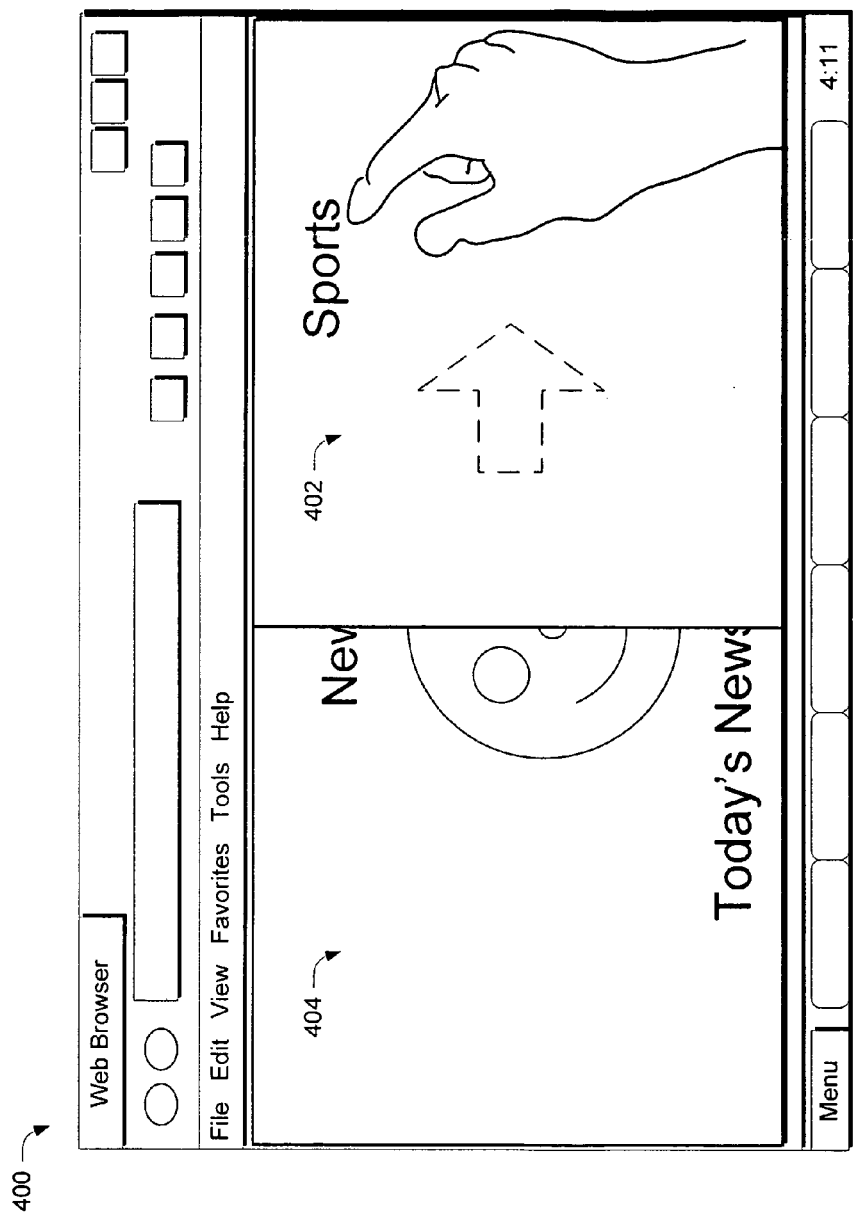
FIG. 4 illustrates an example Web browser user interface in accordance with one or more embodiments.

FIG. 4 illustrates an example Web browser user interface, generally at 300, for implementing a stack representation of direct content manipulation. For purposes of illustration, assume that a user has navigated to a current Web page 402. A user can navigate to a previous Web page 404 by dragging or flicking the current Web page 402 to the right of the Web browser user interface 400. As the current Web page 402 appears to leave the user interface at a right border of the user interface, the previous Web page 404 is revealed underneath the existing current Web page 402. Thus, according to some embodiments, the previous Web page 404 can appear as a static image that appears to be hidden underneath the current Web page 402. The previous Web page 404 can be revealed by removing the current Web page 402 from view, e.g., by dragging or flicking the current Web page 402 to the right.

While not expressly illustrated here, the stack representation can also be used to navigate from a previous Web page to a subsequent Web page. For example, consider the timeline 124. A user can drag or flick Page 2 to the left of a Web browser user interface to reveal Page 3. Thus, the stack representation can be used to navigate forward and/or backward through a timeline of content.

Figure 5:
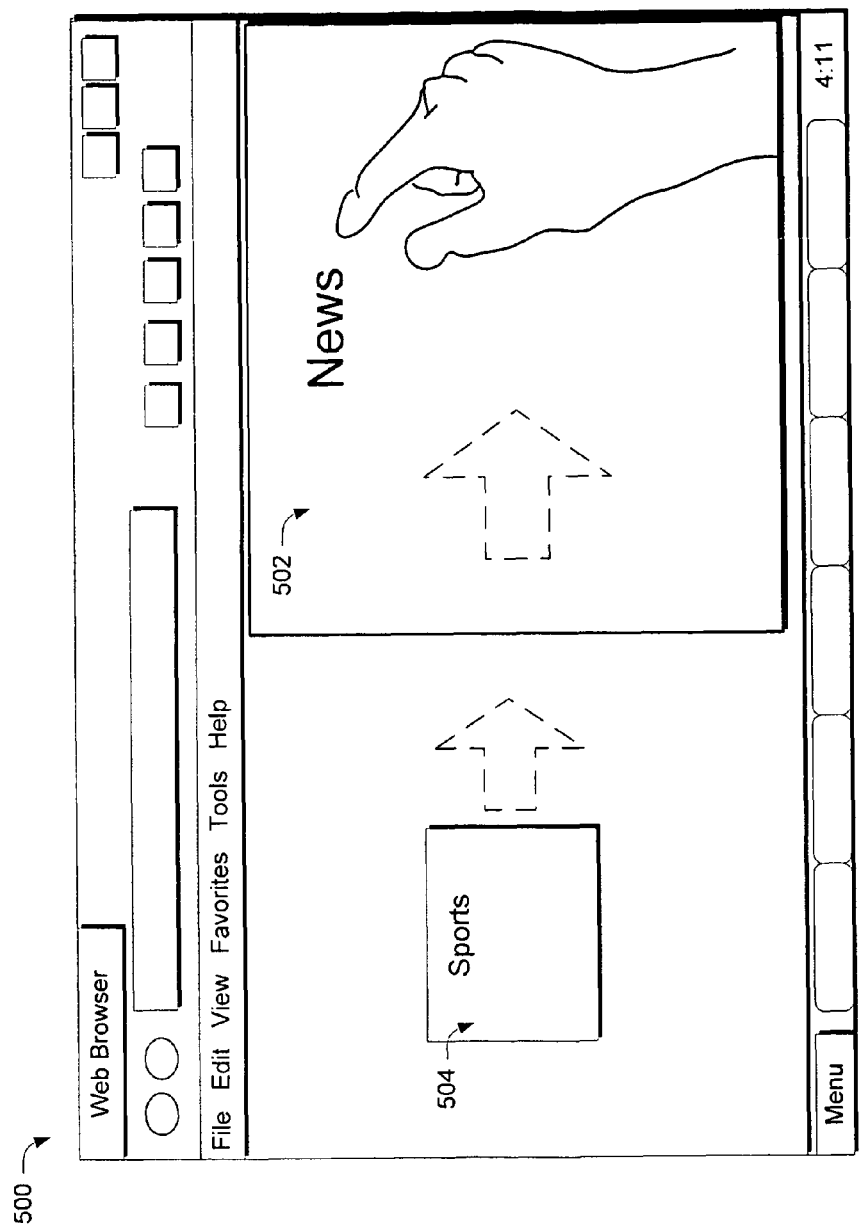
FIG. 5 illustrates an example Web browser user interface in accordance with one or more embodiments.

FIG. 5 illustrates an example Web browser user interface generally at 500 in accordance with one or more embodiments. The Web browser user interface 500 includes a current Web page 502 and a previous page icon 504. According to some embodiments, when a user attempts to navigate from the current Web page 502 to a previous Web page, the previous Web page may take some time to load before an updated version of the previous Web page can be displayed. Thus, in some embodiments, the previous page icon 504 can be displayed until a current version of the previous Web page can be loaded and displayed.

According to some embodiments, to maintain a representation of a visited Web page, a snapshot of the Web page can be captured when a user navigates to the Web page. The snapshot can be catalogued with a Web page identifier (e.g., a uniform resource locator (URL)), as illustrated in travel log 112.

With reference to Web browser user interface 500, a user drags or flicks the current Web page 502 to the right and the previous page icon 504 enters the user interface from the left. In one or more embodiments, the previous page icon 504 is a snapshot of a previous Web page. In some embodiments, the previous page icon 504 serves as a placeholder until an actual instance of a previous Web page can be loaded.

Responsive to the current Web page 502 being dragged or flicked out of the Web browser user interface 500 to the right, a Web page associated with the previous page icon 504 can begin to load. For example, with reference to log entry 114 of the travel log 112, the previous page icon 504 can include the graphic file "C:\graphics\cache\pic1", and the Web page located at "http://www.msn.com" can begin to load. When the Web page is partially and/or completely loaded (e.g., by a Web browser), the previous page icon 504 can be replaced with the actual Web page in the Web browser user interface 500. A variety of different transition techniques can be utilized to replace the previous page icon 504 with an actual instance of the Web page, such as a page wipe, a cross fade between pages, and so on.

In some embodiments, the previous page icon 504 is displayed in the Web browser user interface 500 as smaller than the exiting current Web page 502 to indicate that the previous page icon 504 is a placeholder for a Web page but not necessarily a current version of the Web page. This is but one example, and a variety of other indicator techniques can also be employed to indicate that an incoming image is a placeholder. For example, the incoming page can be displayed in black and white, in lower resolution, and/or with some type of notification that a Web page is being loaded, such as a progress bar. According to some embodiments, an image of an incoming page can be displayed at the same or similar size as an outgoing page, and utilizing one or more of the indicator techniques discussed above to indicate that the image is a placeholder for a Web page that is being loaded.

Figure 6:
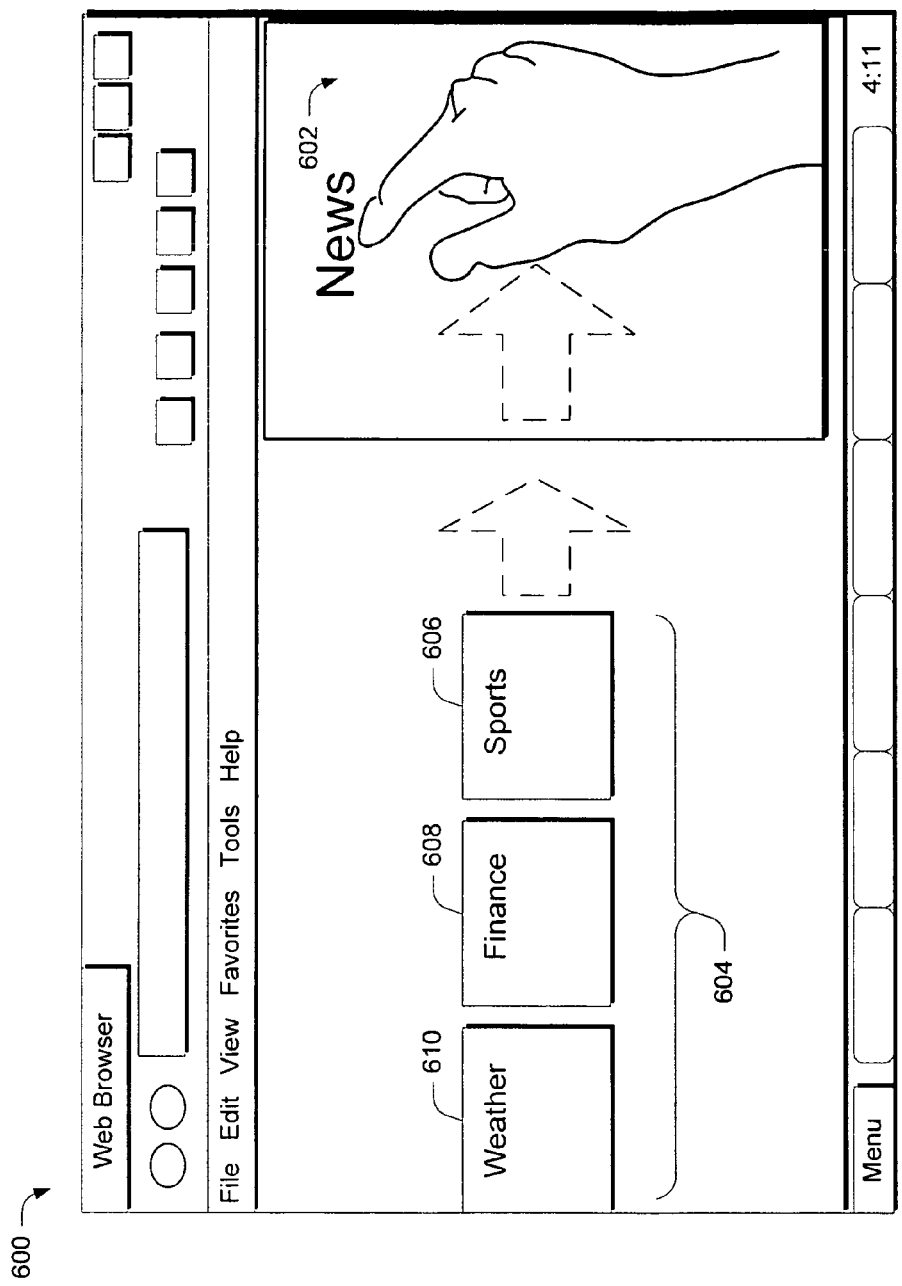
FIG. 6 illustrates an example Web browser user interface in accordance with one or more embodiments.

FIG. 6 illustrates an example Web browser user interface generally at 600 in accordance with one or more embodiments. The Web browser interface 600 includes a current Web page 602 and previous page icons 604. In at least some embodiments, the previous page icons 604 represent a plurality of Web pages that were initially navigated to previously to the current Web page 602. For example, with reference to timeline 124, the current Web page 602 can correspond to page 4, a previous page icon 606 can correspond to Page 3, a previous page icon 608 can correspond to Page 2, and a previous page icon 610 can correspond to Page 1. Thus, the previous page icons can represent all or a portion of a travel log of Web pages to which a user has navigated.

According to some embodiments, a user can drag or flick the current Web page 602 to the right of the Web browser interface 600, and the previous page icons 604 can slide in from the left border of the Web browser interface. One or more of the previous page icons 604 can be selected to cause a Web browser to navigate to a Web page associated with the selected icon. Additionally and/or alternatively, one of the previous page icons 604 can be loaded and/or displayed on the Web browser interface 600 in response to the current Web page 602 being dragged or flicked out of the Web browser interface.

While not expressly illustrated here, in some embodiments the current Web page 602 can be dragged or flicked to the left of the Web browser interface 600 to cause a plurality of icons or other representations of subsequent Web pages to slide in from the right border of the Web browser interface. One of the subsequent Web page icons can be selected to cause a Web page associated with the icon to load and be displayed on the Web browser interface 600. An icon that is associated with content (e.g., a Web page) can include a snapshot of the content and/or some other visual representation of the content.

While FIG. 6 is illustrated with reference to the linear representation of direct content manipulation, some embodiments can utilize similar techniques with the stack representation described above. For example, if the current Web page 602 is dragged or flicked to the right of the Web browser user interface 600, one or more of the previous page icons 604 can appear from underneath the exiting current Web page 602 as static images. Additionally or alternatively, if the current Web page 602 is dragged or flicked to the left of the Web browser user interface 600, one or more subsequent page icons (not illustrated) can appear from underneath the exiting current Web page 602 as static images. A Web page can be loaded in response to a selection of one of the icons and/or a Web page associated with one of the icons can be automatically loaded.

Having described example user interfaces in accordance with one or more embodiments, consider now a discussion of an example mobile device in accordance with one or more embodiments.

Example Mobile Device

Figure 7:
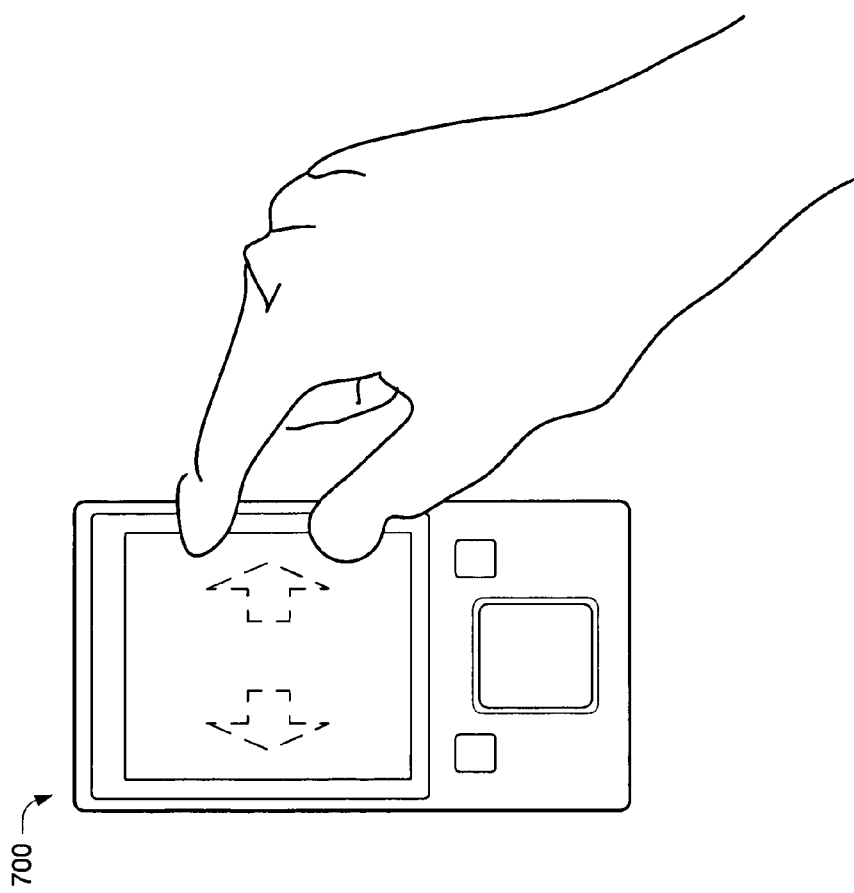
FIG. 7 illustrates an example mobile device that can implement techniques discussed herein in accordance with one or more embodiments.

FIG. 7 illustrates, generally at 700, an example mobile device that can utilize the techniques discussed herein for the direct content manipulation in accordance with one or more embodiments. As illustrated, content (e.g., one or more Web pages) can be dragged or flicked to the left and/or the right of a display screen of the mobile device 700 to cause previously navigated content and/or subsequently navigated content to be displayed. In at least some embodiments, the linear representation and/or the stack representation of direct content manipulation can be utilized via the mobile device 700.

Having described an example mobile device in accordance with one or more embodiments, consider now a discussion of some example methods in accordance with one or more embodiments.

Example Methods

Figure 8:
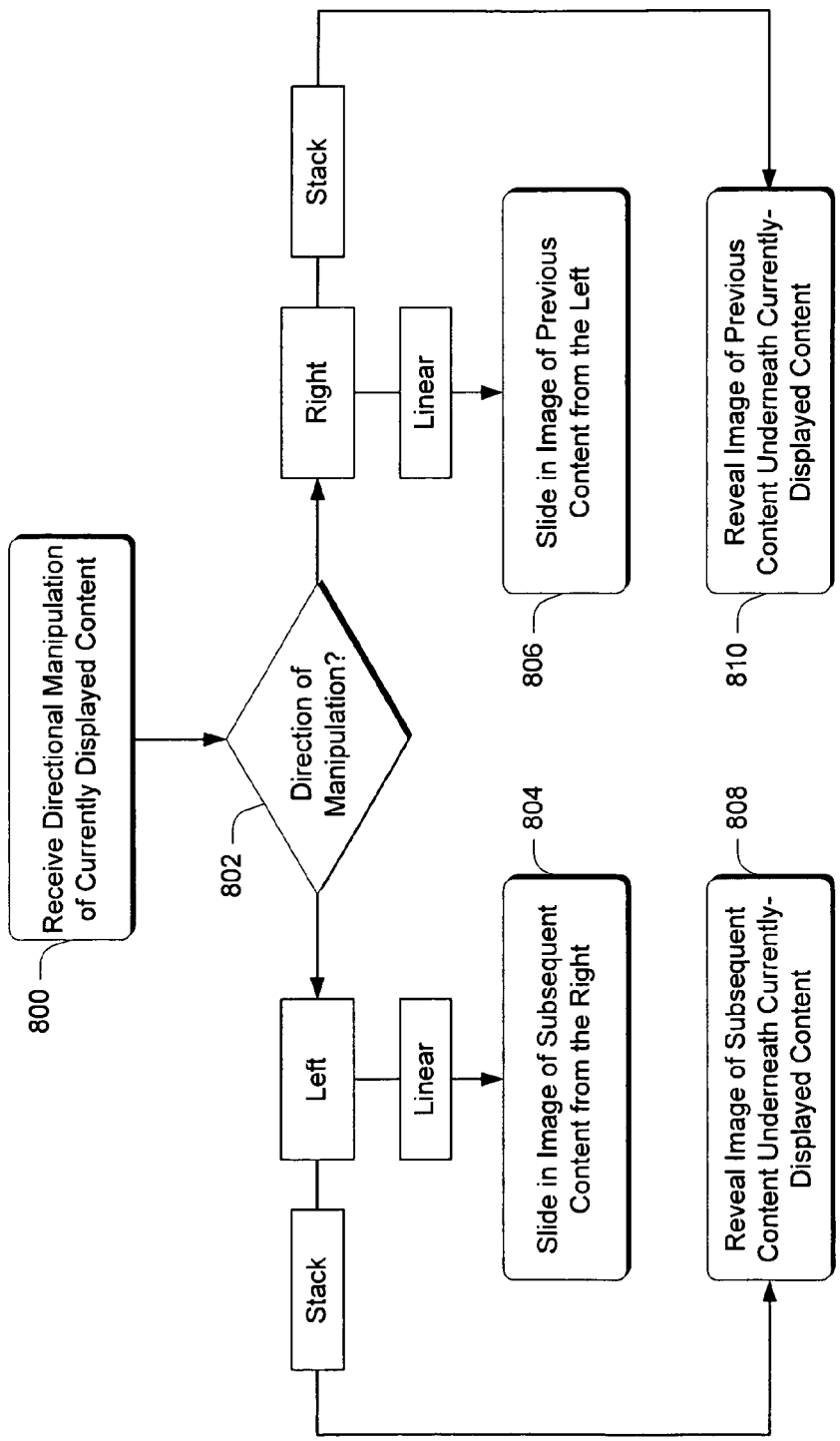
FIG. 8 is a flow diagram that describes steps in a method in accordance with one or more embodiments.

FIG. 8 is a flow diagram that describes a method in accordance with one or more embodiments. The method can be implemented in connection with any suitable hardware, software, firmware, or combination thereof. In at least some embodiments, the method can be implemented by software executing or executable (e.g., a Web browser) to enable linear and/or stack-based navigation of multiple instances content.

Step 800 receives a directional manipulation of currently displayed content. For example, the content can be currently displayed in a Web browser user interface or any other suitable type of application. As discussed above, a variety of forms of manipulation can be utilized, such as dragging or flicking with a finger, a stylus, or other instrument. Step 802 determines a direction of the manipulation. For example, the direction of manipulation can be determined with respect to a user interface in which the currently-displayed content is displayed.

Utilizing the linear representation of direct content manipulation, if the direction of manipulation is to the left (the "Left" block), step 804 slides an image of subsequent content in from the right. According to some embodiments, the image can slide in from a right side of a user interface.

Conversely, in the linear representation, if the direction of manipulation is to the right (the "Right" block), step 806 slides an image of previous content in from the left. According to some embodiments, the image of the previous content can slide in from a left side of a user interface.

Returning to decision block 802 and utilizing the stack representation of direct content manipulation, if the direction of manipulation is to the left (the "Left" block), step 808 reveals an image of subsequent content that appears from underneath the currently-displayed content as the currently-displayed content is manipulated. Conversely, in the stack representation, if the direction of manipulation is to the right (the "Right" block), step 810 reveals an image of previous content that appears from underneath the currently-displayed content as the currently-displayed content is manipulated.

While the linear and stack representations are illustrated as separate processes, it is to be appreciated and understood that the two representations can be combined in a variety of different ways. For example, in some embodiments previous Web pages can enter a Web browser interface via the linear representation and subsequent Web pages can enter the Web browser interface via the stack representation. Alternatively, in some embodiments previous Web pages can enter a Web browser interface via the stack representation (e.g., in response to a manipulation of a current Web page to the right) and subsequent Web pages can enter the Web browser user interface via the linear representation (e.g., in response to a manipulation of a current Web page to the left). These combinations are presented for purpose of example only, and a variety of different combinations are contemplated.

While FIG. 8 is discussed with reference to manipulations to the left causing navigation to subsequent content and manipulations to the right causing navigation to previous content, some embodiments may utilize different correlations between manipulation and navigation. For example, in some embodiments a manipulation of content to the left side of a user interface can cause a navigation to one or more previous instances of content. Alternatively and/or additionally, a manipulation of content to the right side of a user interface can cause a navigation to subsequent content. For purposes of the discussion herein, a particular side of a user interface can be referred to as a first side in the user interface, a second side of the user interface, and so on. In some embodiments, a first side of a user interface can be opposite a second side of the user interface.

Figure 9:
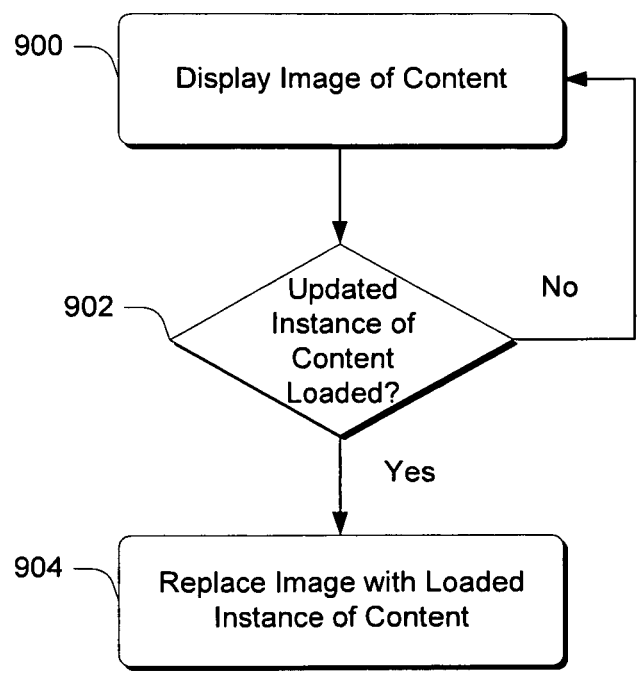
FIG. 9 is a flow diagram that describes steps in a method in accordance with one or more embodiments.

FIG. 9 is a flow diagram that describes a method in accordance with one or more embodiments. The method can be implemented in connection with any suitable hardware, software, firmware, or combination thereof. In at least some embodiments, the method can be implemented by software executing or executable (e.g., a Web browser) to replace a previously-captured image of content with an updated instance of content.

Step 900 displays an image of content. For example, a user can navigate to a Web page using one or more of the techniques discussed herein, and the image can be a previously-captured snapshot of the Web page. With reference to FIG. 8, the image can be of current, previous, and/or subsequent content according to the linear representation and/or stack-based representation of direct content manipulation. Step 902 determines if an updated instance of the content is loaded. For example, when a user navigates to a Web page and a previously-captured snapshot of the Web page is displayed, a Web page that corresponds to the snapshot can begin loading. If an updated instance of content is not loaded (the "No" block), the method returns to step 900 and displays the image of content. If an updated instance of content is loaded (e.g., either partially or completely) (the "Yes" block), step 904 replaces the image with the loaded instance of content. As discussed above, a variety of visual transition techniques can be utilized to replace the image with the updated instance of content.

Having discussed example methods according to one or more embodiments, consider now a discussion of an example system that can be utilized to implement the above-described embodiments.

Example System

Figure 10:
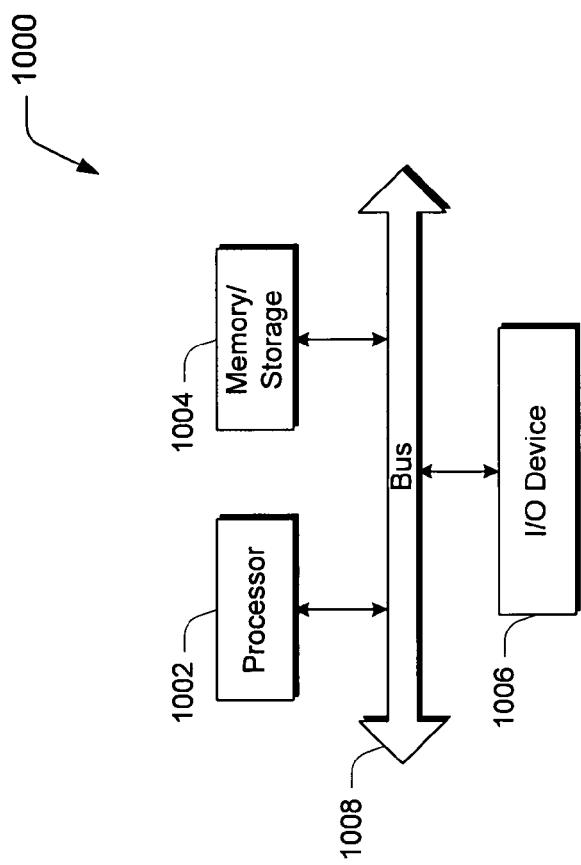
FIG. 10 is a block diagram of a system in accordance with one or more embodiments.

FIG. 10 illustrates an example computing device 1000 that can implement the various embodiments described above. Computing device 1000 can be, for example, computing device 102 of FIG. 1 or any other suitable computing device.

Computing device 1000 includes one or more processors or processing units 1002, one or more memory and/or storage components 1004, one or more input/output (I/O) devices 1006, and a bus 1008 that allows the various components and devices to communicate with one another. Bus 1008 represents one or more of any of several types of bus structures, including a memory bus or memory controller, a peripheral bus, an accelerated graphics port, and a processor or local bus using any of a variety of bus architectures. Bus 1008 can include wired and/or wireless buses.

Memory/storage component 1004 represents one or more computer storage media. Component 1004 can include volatile media (such as random access memory (RAM)) and/or nonvolatile media (such as read only memory (ROM), Flash memory, optical disks, magnetic disks, and so forth). Component 1004 can include fixed media (e.g., RAM, ROM, a fixed hard drive, etc.) as well as removable media (e.g., a Flash memory drive, a removable hard drive, an optical disk, and so forth).

One or more input/output devices 1006 allow a user to enter commands and information to computing device 1000, and also allow information to be presented to the user and/or other components or devices. Examples of input devices include a keyboard, a cursor control device (e.g., a mouse), a touch input device (e.g., a touch screen), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media".

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

CONCLUSION

Various embodiments can provide techniques for direct manipulation of content. The direct manipulation of content can provide an intuitive way for a user to access and interact with content. In at least some embodiments, manipulation of content can be considered "direct" in that content displayed in a user interface (e.g., one or more Web pages in a Web browser user interface) can be moved in and/or out of the user interface in a direction that corresponds to user-initiated movements, such as the user dragging or flicking the content with the user's finger.

Although the subject matter has been described in language specific to structural features and/or methodological steps, it is to be understood that the subject matter defined in the appended claims is not necessarily limited to the specific features or steps described. Rather, the specific features and steps are disclosed as example forms of implementing the claimed subject matter.

What is claimed is:

1. A computer-implemented method comprising:
    receiving an indication of a directional manipulation of a current instance of content in a user interface of a computing device;
    if the directional manipulation is towards a right side of the user interface:
        accessing a cached snapshot that is stored locally on the computing device;
        responsive to the accessing, causing the cached snapshot of a previous instance of content to be displayed in the user interface in a same panel along with the current instance of content;

loading an updated version of the previous instance of content while at least partially displaying the cached snapshot of the previous instance of content; and replacing the cached snapshot of the previous instance of content with the updated version in the user interface; and if the directional manipulation is towards a left side of the user interface, causing a representation of a subsequent instance of content to be displayed in the user interface.

2. The computer-implemented method of claim 1, wherein the indication of the directional manipulation is caused via touch contact with a display screen that displays the user interface.

3. The computer-implemented method of claim 1, wherein if the directional manipulation is towards the right side of the user interface, the method further comprises causing the current instance of content to move towards the right side of the user interface and leave the user interface.

4. The computer-implemented method of claim 3, wherein causing the cached snapshot of the previous instance of content to appear in the user interface comprises causing the cached snapshot of the previous instance of content to slide into the user interface from the left side of the user interface.

5. The computer-implemented method of claim 1, wherein if the directional manipulation is towards the left side of the user interface, the method further comprises causing the current instance of content to move towards the left side of the user interface and leave the user interface.

6. The computer-implemented method of claim 5, wherein causing the representation of the subsequent instance of content to appear in the user interface comprises causing the representation of the subsequent instance of content to slide into the user interface from the right side of the user interface.

7. The computer-implemented method of claim 1, wherein the representation of the subsequent instance of content comprises a snapshot of a Web page.

8. The computer-implemented method of claim 1, wherein the previous instance of content comprises a Web page and the updated version of the previous instance of content comprises an updated version of the Web page.

9. The computer-implemented method of claim 1, the method further comprising:

if the directional manipulation is towards the right side of the user interface, causing the current instance of content to move towards the right side of the user interface and leave the user interface; and wherein causing the cached snapshot of the previous instance of content to be displayed in the user interface comprises causing the cached snapshot of the previous instance of content to appear in the user interface as a static image underneath the current instance of content.

10. The computer-implemented method of claim 1, further comprising:

if the directional manipulation is towards the right side of the user interface, causing the current instance of content to move towards the right side of the user interface, and wherein causing the cached snapshot of the previous instance of content to be displayed in the user interface comprises causing the cached snapshot of the previous instance of content to appear in the user interface as a static image underneath the current instance of content; and if the directional manipulation is towards the left side of the user interface, causing the representation of the subsequent instance of content to appear in the user interface comprises causing the representation of the subsequent instance of content to slide into the user interface from the right side of the user interface.

11. A computer-implemented method comprising:

receiving an indication of a directional manipulation of a current instance of content in a user interface of a computing device;

if the directional manipulation is towards a right side of the user interface:

causing one or more cached snapshots of one or more previous instances of content to be revealed in the user interface as one or more static images in a same panel as the current instance of content is manipulated according to the directional manipulation;

loading, in response to at least one of the cached snapshots of the one or more previous instances of content being at least partially displayed, an updated version of the one or more previous instances of content; and replacing the at least one of the cached snapshots with the updated version; and if the directional manipulation is towards the left side of the user interface, causing one or more images of one or more subsequent instances of content to slide into the user interface from the right side of the user interface.

12. The computer-implemented method of claim 11, wherein one or more of the previous instances of content comprises a Web page, and wherein at least one of the cached snapshots comprises a previously-captured snapshot of the Web page.

13. The computer-implemented method of claim 11, wherein the indication of the directional manipulation is caused via a user contact with a display screen that displays the user interface.

14. The computer-implemented method of claim 11, wherein if the directional manipulation is towards the right side of the user interface, the method further comprises causing a plurality of the static images of the previous instances of content to slide into the user interface from the left side of the user interface, one or more of the plurality of the static images being selectable to cause an updated version of one or more of the previous instances of content to be loaded.

15. The computer-implemented method of claim 14, wherein if the directional manipulation is towards the right side of the user interface, the method further comprises causing one or more of the static images of the previous instances of content to appear underneath the current instance of content as one or more static images according to a stack representation.

16. The computer-implemented method of claim 14, the method further comprising:

receiving an indication of a selection of one of the static images;

responsive to the selection, causing an updated version of a Web page associated with a selected image to be loaded; and when the Web page is loaded, causing the Web page to be displayed in the user interface.

17. A system comprising:

one or more processors; and one or more computer-readable storage media storing a travel log comprising a plurality of entries, and computer-executable instructions that are executable to:

receive an indication of a touch manipulation of one of the plurality of entries that is displayed on a user interface;

if the touch manipulation is towards a first side of the user interface:
  cause one or more cached snapshots of previous entries from the plurality of entries to be retrieved via the travel log and be displayed in the user interface in a same panel along with the one of the plurality of entries indicated by the touch manipulation;
  automatically load an updated version of a previous entry in response to the one or more cached snapshots of the previous entries being displayed; and
  visually transition from the cached snapshots of the previous entries to the updated version of the previous entry; and
if the touch manipulation is towards a second side of the user interface, cause a representation of a subsequent entry from the plurality of entries to appear in the user interface.

18. The system of claim 17, wherein the first side of the user interface is a left side of the user interface, and the second side of the user interface is a right side of the user interface.

19. The system of claim 17, wherein the computer-executable instructions are further executable to:
  if the touch manipulation is towards the first side of the user interface, cause the cached snapshot of the previous entry to slide into the user interface from the second side of the user interface; and
  if the touch manipulation is towards the second side of the user interface, cause the representation of the subsequent entry to slide into the user interface from the first side of the user interface.

20. The system of claim 19, wherein the computer-executable instructions are further executable to:
  if the touch manipulation is towards the second side of the user interface, cause an entry associated with the representation of the subsequent entry to be loaded and displayed.

* * * * *